3 Sheets—Sheet 1.

C. AMAZEEN.

Assignor by mesne assignments to The Union Paper-Bag Machine Co.

PAPER-BAG MACHINES.

No. 7,876. Reissued Sept. 11, 1877.

3 Sheets—Sheet 2.

C. AMAZEEN.

Assignor by mesne assignments to The Union Paper-Bag Machine Co.

PAPER-BAG MACHINES.

No. 7,876. Reissued Sept. 11, 1877.

Witnesses:
Geo. H. Graham.
J. E. Kluber.

Inventor:
Christopher Amazeen,
by Munson & Philipp
Attorneys.

3 Sheets—Sheet 3.

C. AMAZEEN.

Assignor by mesne assignments to The Union Paper-Bag Machine Co.

PAPER-BAG MACHINES.

No. 7,876. Reissued Sept. 11, 1877.

Witnesses;
Geo. H. Graham.
J. E. Kluber.

Inventor;
Christopher Amazeen,
by Munson & Philipp
Attorneys.

UNITED STATES PATENT OFFICE.

CHRISTOPHER AMAZEEN, OF NEW YORK, N. Y., ASSIGNOR, BY MESNE ASSIGNMENTS, TO THE UNION PAPER BAG MACHINE COMPANY, OF PHILADELPHIA, PA.

IMPROVEMENT IN PAPER-BAG MACHINES.

Specification forming part of Letters Patent No. 84,076, dated November 17, 1868; Reissue No. 7,876, dated September 11, 1877; application filed June 16, 1877.

*To all whom it may concern:*

Be it known that I, CHRISTOPHER AMAZEEN, of the city, county, and State of New York, have invented certain new and useful Improvements in Paper-Bag Machines; and do hereby declare that the following is a full, clear, and exact description thereof, reference being had to the accompanying drawings, and to the letters of reference marked thereon.

In the annexed drawings, forming a part of this specification, is represented, in—

Figure 1:
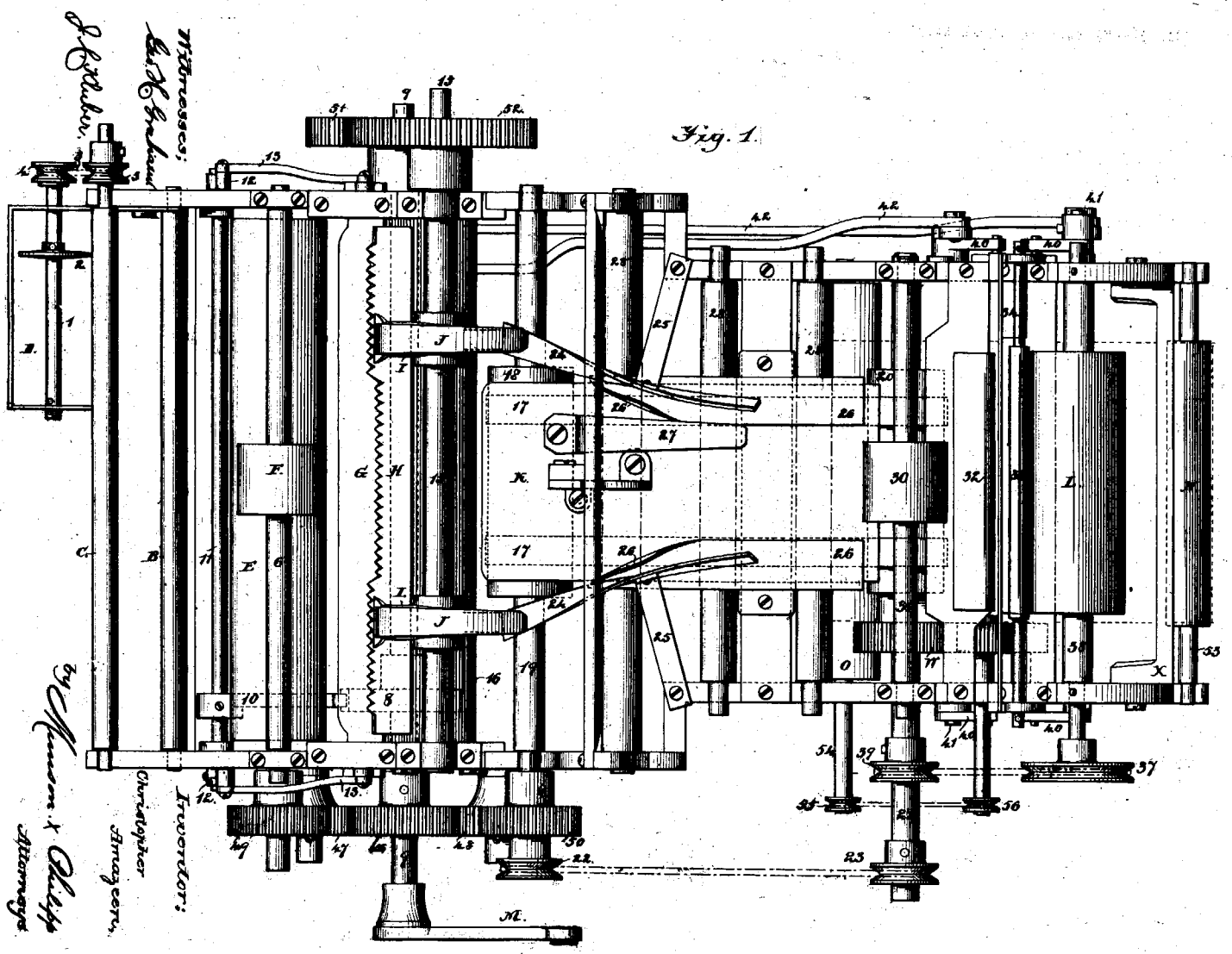
Figure 2:
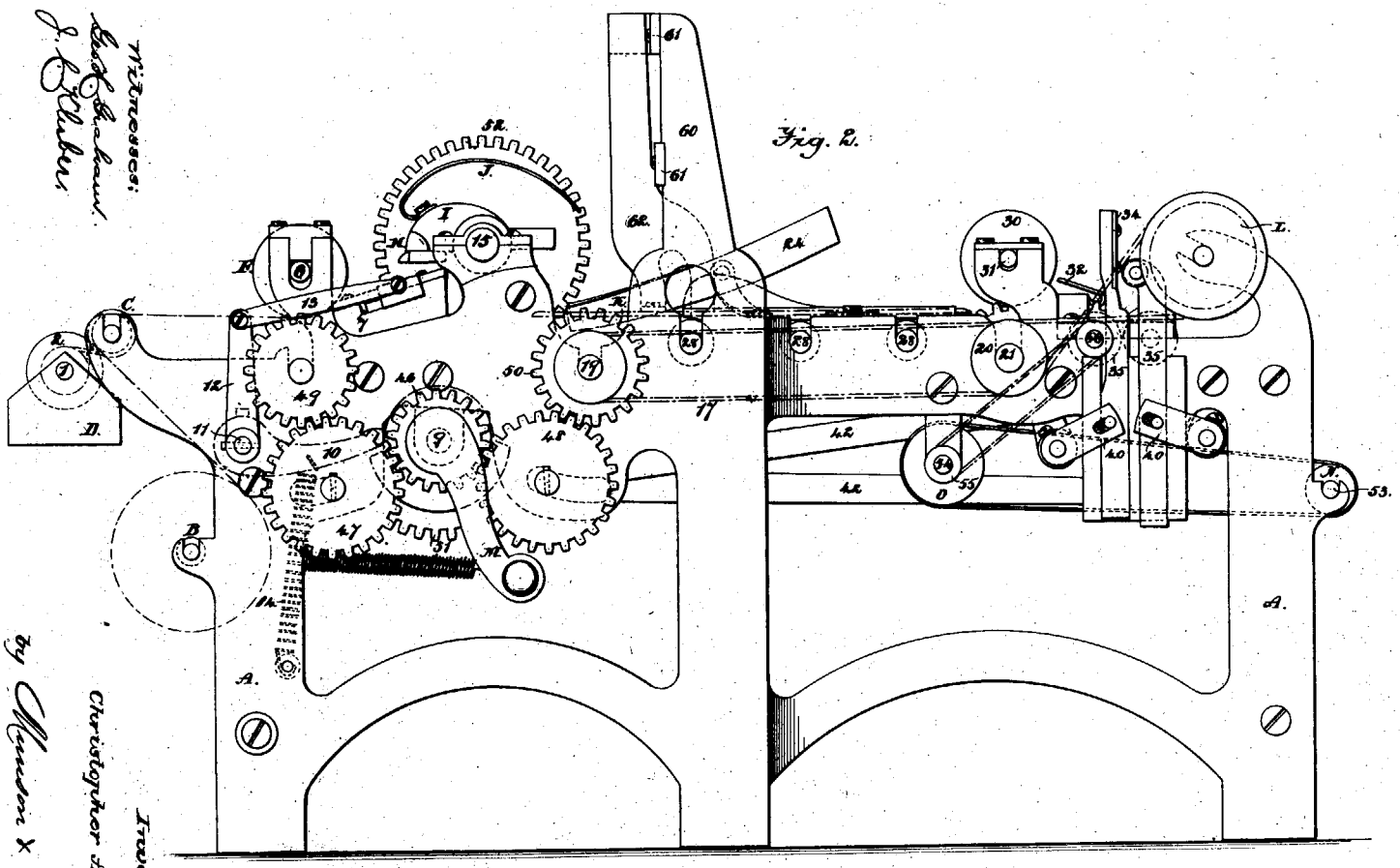
Figure 3:
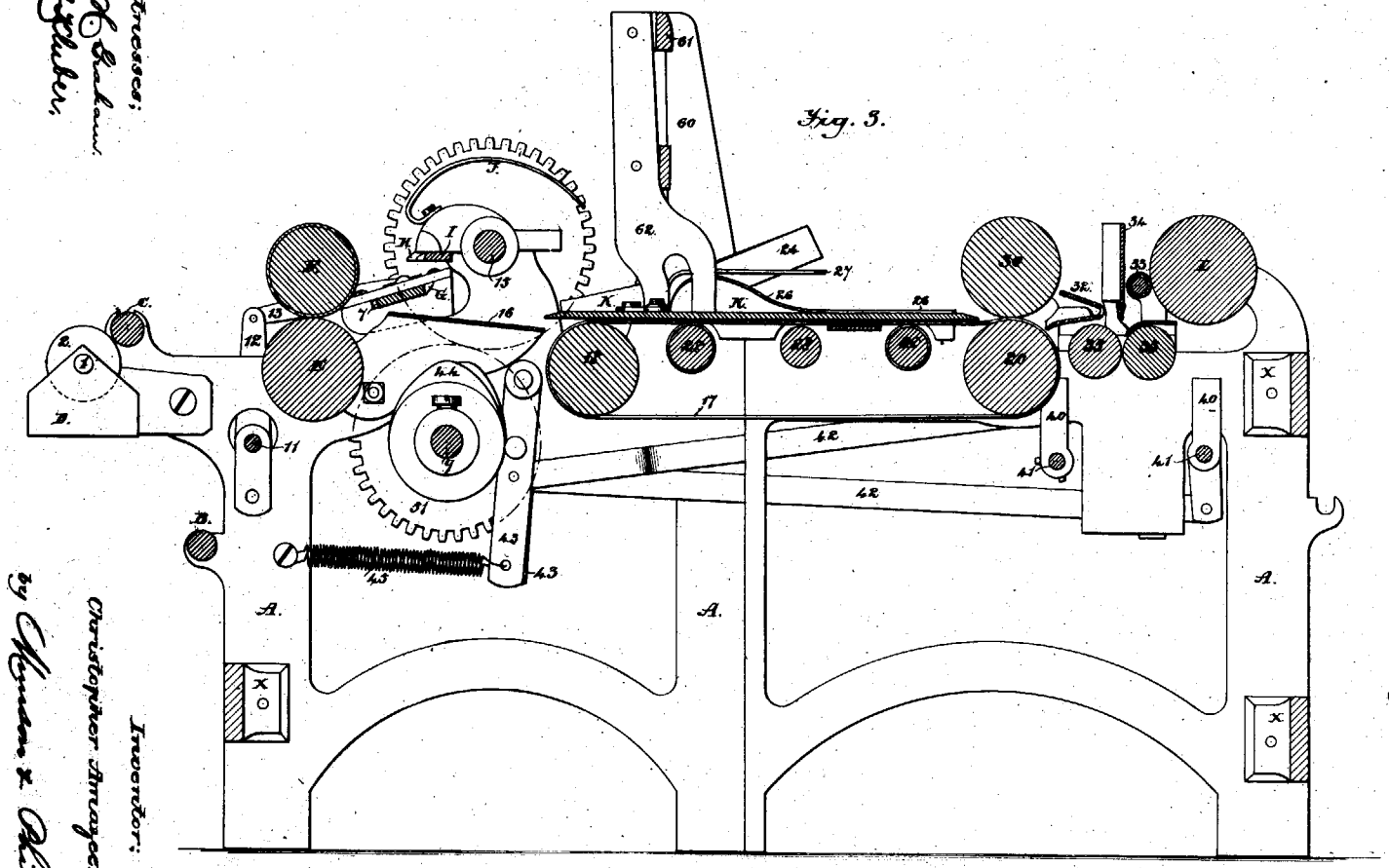

Figure 1, a plan view; Fig. 2, a side view; and, in Fig. 3, a longitudinal vertical section, taken through the center of the machine.

This invention consists in the general arrangement of the elements of the machine for the purpose of making paper bags with great facility and speed.

To enable others skilled in the art to make and use this invention, its construction and operation will now be described.

A marks the side frames, made of suitable material, preferably metal, and tied together by brace-rods X, in which side frames all the shafts and rollers have their bearings.

B is the shaft or spindle on which the web of paper to be made into bags is rolled. This web of paper is carried over the roller C, passing between it and the paste-box D. This paste-box D is fastened to one side of frame A, and supports within it a shaft, 1, carrying a pasting-wheel, 2, fastened on it, which shaft is turned by a band, 3, running around the pulleys 4 and 5, on the ends of the shafts C and 1, motion being imparted from the roller C as it is revolved by the movement of the paper web as it is carried forward. The pasting-wheel 2 bears upon, and in this manner distributes the paste on, the edge of the web of paper. This pasting-wheel 2 is held upon the shaft 1 by a set-screw, and it may be moved to any point on said shaft, according to the width of the web and the size of bags to be made. The web of paper, with its edge pasted, is passed between the rollers E and F. The roller F is a short one, fixed at a central point upon the shaft 6, and rides loosely upon the roller E, which is driven by the toothed wheel 49, which, through an intermediate wheel, 47, receives motion from a gear, 46, on the main shaft 9. These rollers carry the paper forward over the knife G, which is supported in a slightly-inclined plane, and is reciprocated in slots 7 in the side frames by a cam-wheel, 8, on the main driving-shaft 9, which wheel lifts the lever 10, fastened to the rock-shaft 11. The knife G is attached to this rock-shaft by means of the jointed levers 12 13, so that, when the lever 10 is lifted or raised by the cam-wheel 8, the knife will move backward in the slots 7. The spiral spring 14, fastened to the under side of the lever 10 and to one side frame, causes the parts to react, and the knife G to move forward again into its proper place. This knife G has its cutting-edge formed of serrated teeth, and its central portion extended a considerable distance beyond its ends. (See Fig. 1.) This extended central portion is of a length equal to the width of the bag to be formed from the web it severs. The cutting-knife H also has an an edge composed of serrated teeth, and its ends protrude a proper distance to adapt it to conform to the shape of, and therefore fit, the knife G. This cutting-knife H is fastened to collars I I on the shaft 15, which is revolving, and the paper web is severed by this knife sweeping by the edge of the knife G, upon which the said web is supported. When thus severed the forward end of the web has its central portion of a length equal to the width of the bag to be made, protruding as a lip a distance sufficient to ultimately form the bottom seam of the bag.

As soon as the knife H has swept past the knife G, the latter recedes, as hereinbefore described, and the spring forwarders J J, which are fastened to the collars I I, press the paper, now cut for the size of bag required, upon a sliding plate, 16, which devices, together, carry it forward till the edge of the paper is delivered under the forward end of the former K, and upon two endless rubber carriers or belts, 17, which run around the roller 18 fast on the shaft 19, and a roller, 20, fast upon a shaft, 21, at the other end of the former K. On the end of this shaft 19 is a pulley, 22, which, by means of a band around the same, drives or turns the pulley 23 on the shaft 21, thus driving the endless rubber carriers or belts carrying the paper bag forward under the former K.

The former K is a flat plate of a width equal to that of the bags to be formed, and is suspended by a bridge formed of brackets 60, cross-bars 61, and upright brace 62.

When the paper first enters between the former K and the rubber carriers, where they pass over the roller 18, its edges are turned up by the guides 24, which are properly curved and held in position by the arms 25; and as the paper is carried forward by the rubber carriers under the former K, the edges thus turned up slip in under the folders 26 and are turned inwardly and down upon the former K, thus forming the paper web into a tube, which envelops the former as said tube passes onward through the machine; but to prevent the pasted edge of the paper from dropping down and adhering to the other edge of the paper before it is desired to have it do so, there is a holder, 27, fastened upon the former K, which sustains the pasted edge until the opposite edge of the paper is completely folded down onto the former by the folder 26, when the two edges are allowed to meet and be joined to form the bag-tube.

28 represents one, two, or more rollers, which serve to hold up the rubber carriers against the bottom of the former K, and insure the carrying forward of the bag. They have flanges upon them at proper distances apart to hold the rubber carriers at any distance from each other that may be required, so that when the bag-tubes arrive at the roller 20 there will be a space between the carriers to allow the short roller 30, fastened onto the shaft 31, to press the pasted edge down to form the bag-tube seam.

The bag-tube thus formed and pasted together has one side of its bottom (the lower) longer than the other, formed by the uneven cut, made, as before described, by the arrangement of the teeth of the knives G and H, and when the bag-tube has passed between the rollers 20 and 30, this lower end or lip will extend and protrude through the slot cut through the apex of the angularly-bent guide-plate 32. The bag passes through this slot, and while its lower or bottom end or lip is protruding through it, said end or lip is pasted by the pasting-roller 33; the folder 34 then descends and doubles the bag-tube upon a line considerably behind the outer edge of the pasted lip, this operation forcing the bag-tube on the line of doubling between the cylinders or rollers 35. In passing between these the lip is pressed down on and united to the body of the tube, thus forming a bag, which drops down underneath the machine. These rollers 35 are geared together, and are turned by gear-wheels inside of the frame, which receive motion from a gear-wheel, W, on the shaft 21.

The pasting-roller 33 is supplied with paste from a larger roller, L, which runs in a paste-box, and which is turned by the pulley 37 on its shaft 38 by means of a band around it and around the pulley 39 on the shaft 21.

The pasting-roller 33 and the folder 34 are reciprocated perpendicularly in grooves in the side frames by means of the bell-cranks 40, on the rock-shafts 41, and the arms or rods 42, which are attached to levers 43, near the main driving-shaft 9, so that when this latter is turned cam-wheels 44 will press the levers 43 forward with the rods or arms 42, which then turn the bell-cranks 40, so that the folder and pasting-roller are moved downward, and the spiral springs 45, attached to levers 43, bring them back, thus allowing the folder and pasting-roller to again move up.

The machine is operated by means of a crank, M, on the main or driving shaft 9, which turns the toothed wheel 46, and, by means of gear-wheels 47, 48, 49, 50, turns the roller E and the shaft 19, with its roller 18. At the other end of the main shaft 9 is a cogged wheel, 51, which, meshing with a companion-wheel, 52, drives or turns the shaft 15, on which the collars I I, cutting-knife H, and spring-fowarders J J are fastened.

Instead of having the bags, when completed and having passed between the rollers 35, to drop down underneath, they may be made to come out at the end of the machine, by means of bands passing around a roller, N, on the shaft 53, and beneath the rollers 35, to and around another shaft, 54, with a similar roller, O, under or beneath the forward end of the former K, and this shaft 54 may be operated upon by a pulley, 55, on the same, and a pulley, 56, on the extended shaft of one of the rollers 35.

To make different sizes of bags, the wheel 46 on the main shaft can be changed to either a larger or smaller wheel, and the gear-wheels 47 48 brought closer or farther apart, as they are fastened in slots in the side frame. For the same purpose the knives G and H must also be changed.

The folders 26 can be moved either out or in, to suit the former K, which must be changed according to the width of the bag required.

A movable guard may be employed on the revolving knife H to press the paper down beneath the arc of its motion, in order that the knife may pass without interfering with the paper in its passage.

Having thus fully described the invention, what is claimed is—

1. In a machine for making paper bags, the combination, with a knife having a protruding central portion, of a knife correspondingly formed and mounted in a rotating carrier, the two knives co-operating to sever a paper-bag blank, having one protruding lip at one and two at the opposite end, substantially as described.

2. The combination of the reciprocating knife G and rotating knife H, substantially as described.

3. The combination of the knives G and H and spring-forwarders 5, substantially as described.

4. The combination of the former K with the pressing-roller 30, whereby the pasted side of the bag-tube is pressed and united, substantially as described.

5. The combination of the endless rubber carriers or aprons 17 with the former K, and one or more pairs of flanged rollers, 28, supporting said carriers or aprons 27, substantially as described.

6. The combination of the movable or reciprocating pasting-roller 33 and the folding-blade 34, for pasting the projecting lip and forming the bottom of the bag, substantially as described.

7. The combination of the paste-supply roll L with the bottom-seam movable or reciprocating pasting-roller 33 and the folding-blade 34, substantially as described.

8. The laterally-adjustable paste-wheel 2, substantially as described.

In testimony whereof I have hereunto set my hand in the presence of two subscribing witnesses.

CHRISTOPHER AMAZEEN.

Witnesses:

GEORGE WEST,

M. B. PHILIPP.